US009983419B1

(12) United States Patent
Lee et al.

(10) Patent No.: US 9,983,419 B1
(45) Date of Patent: May 29, 2018

(54) OPTICAL MODULATOR AND OPTICAL MODULATING ARRAY INCLUDING THE SAME

(71) Applicant: SAMSUNG ELECTRONICS CO., LTD., Suwon-si (KR)

(72) Inventors: Eunkyung Lee, Seoul (KR);
Byounglyong Choi, Seoul (KR);
Jungwoo Kim, Hwaseong-si (KR);
Kyuil Lee, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/584,178

(22) Filed: May 2, 2017

(30) Foreign Application Priority Data

Nov. 8, 2016 (KR) .......................... 10-2016-0148184

(51) Int. Cl.
*G02F 1/01* (2006.01)
*G02F 1/19* (2006.01)
*G02B 6/10* (2006.01)

(52) U.S. Cl.
CPC ................ *G02F 1/011* (2013.01); *G02B 6/10* (2013.01); *G02F 1/0102* (2013.01); *G02F 1/19* (2013.01); *G02F 2202/10* (2013.01); *G02F 2203/50* (2013.01)

(58) Field of Classification Search
CPC ....................................................... G02F 1/011
See application file for complete search history.

(56) References Cited

U.S. PATENT DOCUMENTS

| 4,257,016 | A | 3/1981 | Kramer, Jr. et al. |
| 7,492,975 | B2 | 2/2009 | Toyoda et al. |
| 8,363,685 | B2 | 1/2013 | Kim et al. |
| 8,842,942 | B2 | 9/2014 | Shin et al. |
| 2004/0081388 | A1* | 4/2004 | Koyama ................ B82Y 20/00 385/16 |
| 2010/0014821 | A1* | 1/2010 | Tokushima ............ B82Y 20/00 385/129 |

FOREIGN PATENT DOCUMENTS

| KR | 10-2005-0041605 A | 5/2005 |
| KR | 10-2011-0092044 A | 8/2011 |
| KR | 10-2012-0038766 A | 4/2012 |

OTHER PUBLICATIONS

Van Acoleyen et al., "One-Dimensional Off-Chip Beam Steering and Shaping Using Optical Phased Arrays on Silicon-on-Insulator", Journal of Lightwave Technology, Dec. 1, 2011, pp. 3500-3505, vol. 29, No. 23, DOI: 10.1109/JLT.2011.2171477.
Kroesen et al., "Refractive index determination of SiGe using reactive ion etching/ellipsometry: Application for the depth profiling of the Ge concentration", Applied Physics Letters, Mar. 16, 1992, pp. 1351-1353, vol. 60, No. 11.

* cited by examiner

*Primary Examiner* — Omar R Rojas
(74) *Attorney, Agent, or Firm* — Sughrue Mion, PLLC

(57) ABSTRACT

An optical modulator may include an optical wave guide configured to allow a light to pass therethrough, and an optical modulating layer embedded in the optical wave guide and configured to modulate a phase of the light. The optical wave guide may include a first material that has a first lattice constant. The optical modulating layer may include a second material that has a second lattice constant different from the first lattice constant. The phase of the light may be modulated by the optical modulating layer based on a difference between the first lattice constant and the second lattice constant.

20 Claims, 6 Drawing Sheets

OPTICAL MODULATOR AND OPTICAL MODULATING ARRAY INCLUDING THE SAME

CROSS-REFERENCE TO RELATED APPLICATION

This application claims priority from Korean Patent Application No. 10-2016-0148184, filed on Nov. 8, 2016, in the Korean Intellectual Property Office, the disclosure of which is incorporated herein in its entirety by reference.

BACKGROUND

1. Field

The present disclosure relates to an optical modulator capable of modulating phases and an optical modulating array including the same.

2. Description of the Related Art

Optical phase array (OPA) technology is mainly used for modulating phases and wavelengths. A light-steering light detection and ranging (LIDAR) structure including silicon semiconductors may include a light input unit, a light separator, a phase modulator, and a light output unit of a grating coupler type. Outputted light may be steered by means of phase modulation.

Phase modulation methods may include a method of providing heat to a wave guide when light proceeds in the wave guide, a method of electrically injecting electric charges into the wave guide, a method of applying an electric field to the wave guide, etc.

When a heat method or an electrical method is used for phase modulation, a change in a refractive index may not be large enough, and thus, problems such as a reduction in modulation efficiency or an increase in sizes of elements may occur. In addition, when methods of various modulation types are used, an adverse effect may occur or a modulation speed may vary. Thus, effect maximization may be difficult to realize even when various methods are simultaneously used.

SUMMARY

Provided are an optical modulator capable of modulating phases and an optical modulating array including the same.

Additional aspects will be set forth in part in the description which follows and, in part, will be apparent from the description, or may be learned by practice of various exemplary embodiments.

According to an aspect of an exemplary embodiment, an optical modulator may include: an optical wave guide configured to allow a light to pass therethrough, the optical wave guide including a first material having a first lattice constant; and an optical modulating layer embedded in the optical wave guide, the optical modulating layer including a second material having a second lattice constant different from the first lattice constant, and the optical modulating layer being configured to modulate a phase of the light based on a difference between the first lattice constant and the second lattice constant.

In addition, each of the optical wave guide and the optical modulating layer may include at least one of a group IV element, a group III element, a group V element, and a silicon nitride.

A ratio of the second lattice constant to the first lattice constant may be equal to or greater than about 0.9 and equal to or less than about 1.1.

The optical modulating layer may include an element that is not included in the optical wave guide.

The optical modulating layer may include a first element included in the optical wave guide and a second element not included in the optical wave guide.

A composition ratio of the first element and the second element may be constant.

Both the optical wave guide and the optical modulating layer may include the first and second elements, and a composition ratio of the first element and the second element in the optical wave guide may be different from a composition ratio of the first element and the second element in the optical modulating layer.

The optical modulating layer may include a thin layer.

A thickness of the optical modulating layer may be equal to or less than about 100 nm.

A longitudinal direction of the optical modulating layer may be parallel to a longitudinal direction of the optical wave guide.

The longitudinal direction of the optical modulating layer may intersect with the longitudinal direction of the optical wave guide.

A portion of the optical modulating layer may be exposed to a surface of the optical wave guide.

An entire surface area of the optical modulating layer may be surrounded by the optical wave guide.

In addition, the optical modulator may further include an additional optical modulating layer embedded in the optical wave guide, the additional optical layer being separated from the optical modulating layer.

The optical modulating layer and the additional optical modulating layer may be arranged in a direction parallel to the longitudinal direction of the optical wave guide or a direction perpendicular to the longitudinal direction of the optical wave guide.

The optical modulator may further include a heat providing layer disposed on the optical modulator and configured to provide heat to the optical modulator.

The heat providing layer may overlap with at least a portion of the optical modulating layer.

According to an aspect of an exemplary embodiment, an optical modulating array may include one or more modulating layers separated from each other.

At least two optical modulators of the one or more optical layers may have different levels of phases to be modulated.

A level of the phase to be modulated may vary depending on at least one of a location, a size, a number, and a material of the one or more optical modulating layers.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
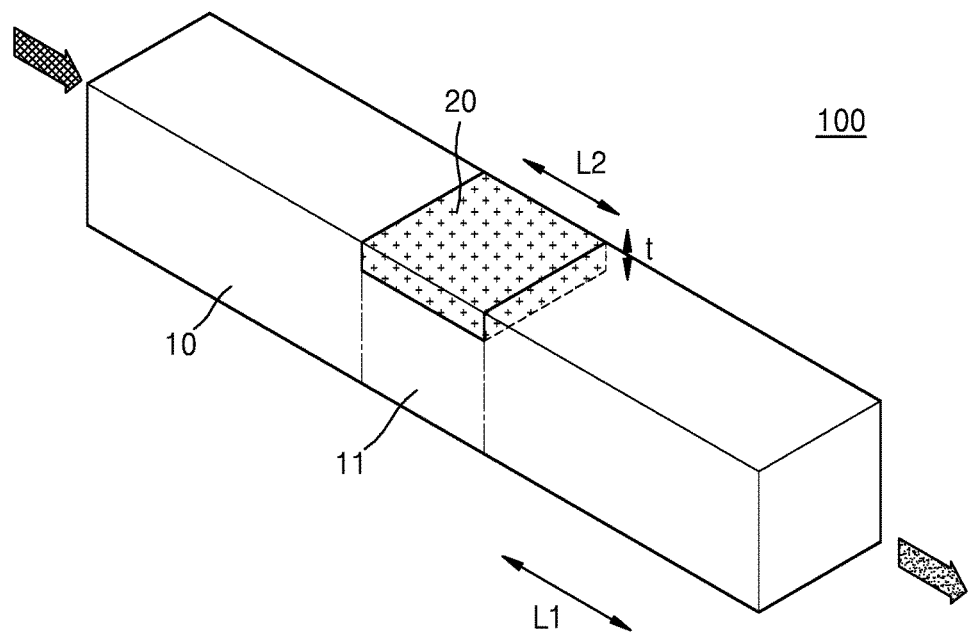
FIG. 1 is a diagram of an optical modulator according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Below, detailed descriptions on an optical modulator and an optical modulating array according to exemplary embodiments will be provided with reference to the attached drawings. Widths and thicknesses of layers or areas illustrated in the attached drawings may be exaggerated for convenience of explanation. Throughout the specification, like reference numerals in the drawings denote like elements.

FIG. 1 is a diagram of an optical modulator 100 according to an exemplary embodiment. As illustrated in FIG. 1, the optical modulator 100 may include an optical wave guide 10 through which light proceeds and an optical modulating layer 20 embedded in the optical wave guide 10. The optical modulating layer 20 modulates a phase of light passing therethrough based on a difference in a lattice constant with respect to the optical wave guide 10.

The optical wave guide 10 may be a layer transmitting incident light with small light loss. A length of the optical wave guide 10 may be greater than a side length of a cross-section of the optical wave guide 10. Thus, light may be incident on the optical wave guide 10 at an end of the optical wave guide 10, proceed in a longitudinal direction L1 of the optical wave guide 10, and then, exit through another end of the optical wave guide 10. In other words, the longitudinal direction L1 of the optical wave guide 10 may be the same as a direction in which light proceeds. The length of the optical wave guide 10 may be in a range from dozens of micrometers to hundreds of micrometers. The optical wave guide 10 is illustrated as a hexahedron (e.g., a rectangular cuboid) in FIG. 1. However, the present disclosure is not limited thereto. The optical wave guide 10 may have various shapes such as a polygonal column, a cylinder, and an elliptical column.

The optical wave guide 10 may include one of group IV elements, group III/V elements, silicon dioxides, and silicon nitrides. However, the present disclosure is not limited thereto. For example, the optical wave guide 10 may include silicon (Si) as a group IV element, at least one of aluminum (Al), gallium (Ga), and indium (In) as a group III element, binary compound, ternary compound, or quaternary compound formed with at least one of phosphorus (P), arsenic (As), and antimony (Sb) as a group V element, silicon nitride (SiN), and at least one combination of these elements.

The optical modulating layer 20 may be embedded in the optical wave guide 10. As illustrated in FIG. 1, at least a portion of the optical modulating layer 20 may be embedded from a surface of the optical wave guide 10 toward the inside of the optical wave guide 10. In addition, the other portion of the optical modulating layer 20 may extend to the surface of the optical wave guide 10 and be exposed together with the optical wave guide 10.

The optical modulating layer 20 may be of a thin layer type. For example, a longitudinal direction L2 of the optical modulating layer 20 may be parallel to the longitudinal direction L1 of the optical wave guide 10, and a direction of a thickness t of the optical modulating layer 20 may intersect with the longitudinal direction L1 of the optical wave guide 10. In addition, the thickness t of the optical modulating layer 20 may be less than a length of the optical modulating layer 20 and may be, for example, equal to or less than about 100 nm. The optical modulator 100 may be formed by an epi-growth method or a deposition method.

The optical modulating layer 20 may include a material having a different lattice constant from the optical wave guide 10, and modulate the phase of the light proceeding therethrough by means of the above-described difference in the lattice constant. A lattice constant may refer to a physical dimension of unit cells in a crystal lattice of the given material. Even though materials included in the optical modulating layer 20 and the optical wave guide 10 may be different from each other, the lattice constant of the optical modulating layer 20 and that of the optical wave guide 10 may be similar to each other. For example, a ratio of the lattice constant of the optical wave guide 10 to the lattice constant of the optical modulating layer 20 may be in the range of about 0.9 to about 1.1. In addition, a refractive index of the optical modulating layer 20 and the refractive index of the optical wave guide 10 may be similar to each other. For example, a difference between the refractive index of the optical modulating layer 20 and the refractive index of the optical wave guide 10 may be equal to or less than about 1.5.

The optical modulating layer 20 may include at least one of group IV elements, group III/V elements, silicon oxides, and silicon nitrides. However, the present disclosure is not limited thereto. For example, the optical wave guide 10 may include Si as a group IV element, at least one of Al, Ga, and In as a group III element, binary compound, ternary compound, or quaternary compound formed with at least one of P, As, and Sb as a group V element, SiN, and at least one combination of these elements.

In detail, the optical wave guide 10 and the optical modulating layer 20 may include different elements from each other. In other words, the optical wave guide 10 may include a first element, while the optical modulating layer 20 may include a second element. Even though the first element and the second element are different from each other, lattice constants thereof may be similar to each other. For example, the optical wave guide 10 may include Si, while the optical modulating layer 20 includes Ge. The Si and Ge may have single crystals. A ratio of a difference in the lattice constants between Si and Ge over the lattice constant of Si may be about 4%. Thus, if the optical modulating layer 20 is allowed to grow epitaxially, strain may occur in the optical modulating layer 20 having a thickness of equal to or less than several nanometers and the phase of a proceeding light may be modulated.

Alternatively, the optical modulating layer 20 may further include other elements in addition to elements included in the optical wave guide 10. In other words, the optical wave guide 10 may include the first element, and the optical modulating layer 20 may include the first and second elements. For example, the optical wave guide 10 may include Si, while the optical modulating layer 20 includes a Si—Ge alloy in a Si—Ge super-lattice. For example, when the optical modulating layer 20 includes the Si—Ge alloy, a change in the refractive index thereof may be approximately about 0.05 when a composition ratio of Si to Ge is about 80:20, and thus, this method may be more efficient for changing the refractive index than conventional electrical or thermal methods. When the optical modulating layer 20 includes a plurality of elements, the composition ratio between the plurality of elements may be constant or may vary. The composition ratio and a change in the composition ratio may vary depending on the phase to be modulated.

Even though the optical wave guide 10 and the optical modulating layer 20 include identical elements, the lattice constants of the optical wave guide 10 and the optical modulating layer 20 may vary according to different composition ratios between elements. For example, the optical wave guide 10 may include $SiO_2$, while the optical modulating layer 20 includes $SiO_3$.

When the optical modulating layer 20 having a different lattice constant is embedded in the optical wave guide 10, the phase of light proceeding through the optical modulating layer 20 may be modulated due to a difference in the lattice constants. In detail, when materials having mismatched lattice constants are laminated, the strain may occur in each material due to the difference in the lattice constants. The strain may change effective mass of electrons or holes in the optical modulating layer 20 and change optical characteristics such as the refractive index. In addition, the optical characteristics may modulate the phase of the proceeding light.

As described above, when the optical modulating layer 20 having the strain generated therein is embedded in a portion of the optical wave guide 10 having light proceeding therethrough, a phase modulation may easily occur. Thus, power consumption for the phase modulation may be reduced and forming a structure for controlling the phase modulation may be simplified.

As the optical modulating layer 20 becomes thicker, defects such as dislocation may occur and accumulated strain may disappear. Thus, the optical modulating layer 20 may need to have a thickness at which the strain does not disappear. For example, the optical modulating layer 20 may have a thickness of approximately equal to or less than about 100 nm. When an area in which the optical wave guide 10 and the optical modulating layer 20 overlap (hereinafter an "optical wave layer") is also of a thin layer type, the strain may occur. In other words, the optical wave layer may modulate the phase of light, due to the thickness thereof as the optical modulating layer 20. For example, when the optical wave layer becomes thick enough for the accumulated strain to disappear, the optical wave layer may not modulate the phase of light. However, when the optical wave layer becomes too thin, the strain may not disappear and thus, the phase of light proceeding through the optical wave layer may be modulated.

In FIG. 1, the optical modulating layer 20 is illustrated as a portion thereof exposed to a top side area of the optical wave guide 10. However, the present disclosure is not limited thereto. The optical modulating layer 20 may be at various locations in the optical wave guide 10 and a plurality of optical modulating layers 20 may be in the optical wave guide 10.

Figure 2:
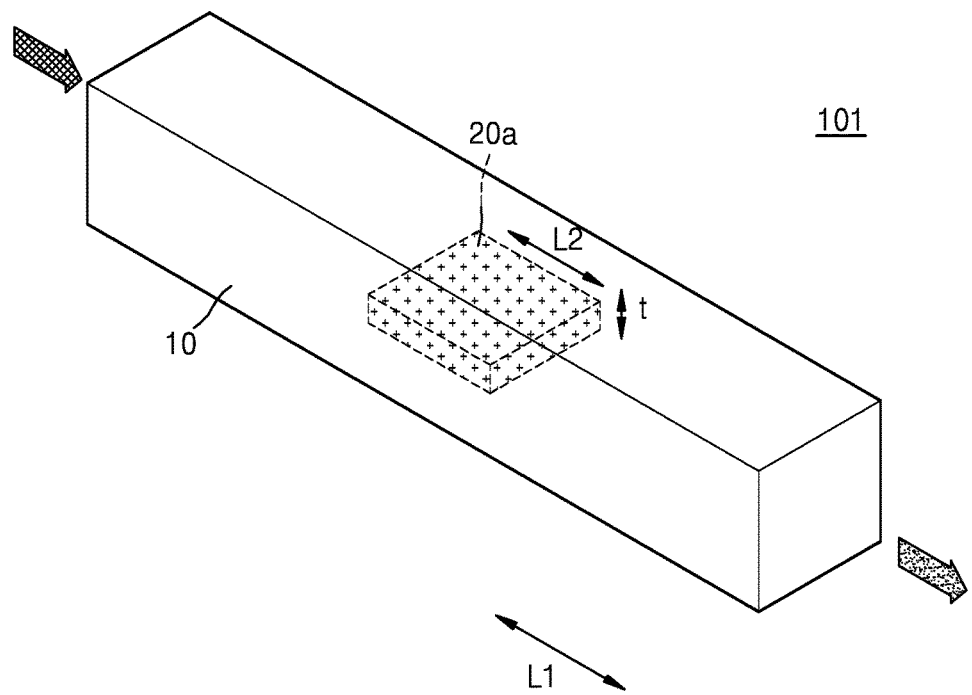
FIGS. 2 through 4 are diagrams of optical modulators according to different embodiments.
Figure 3:
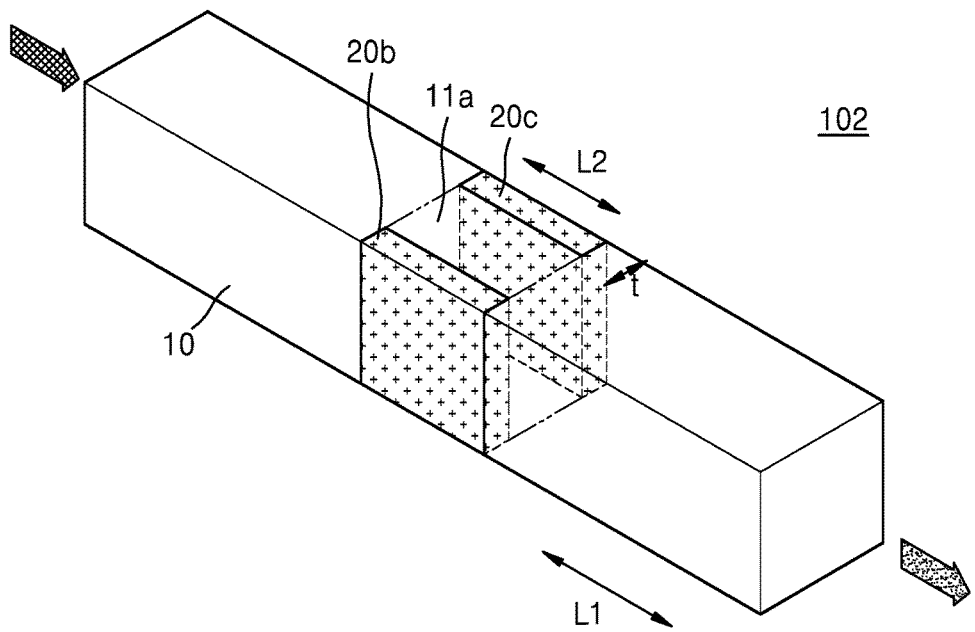
Figure 4:
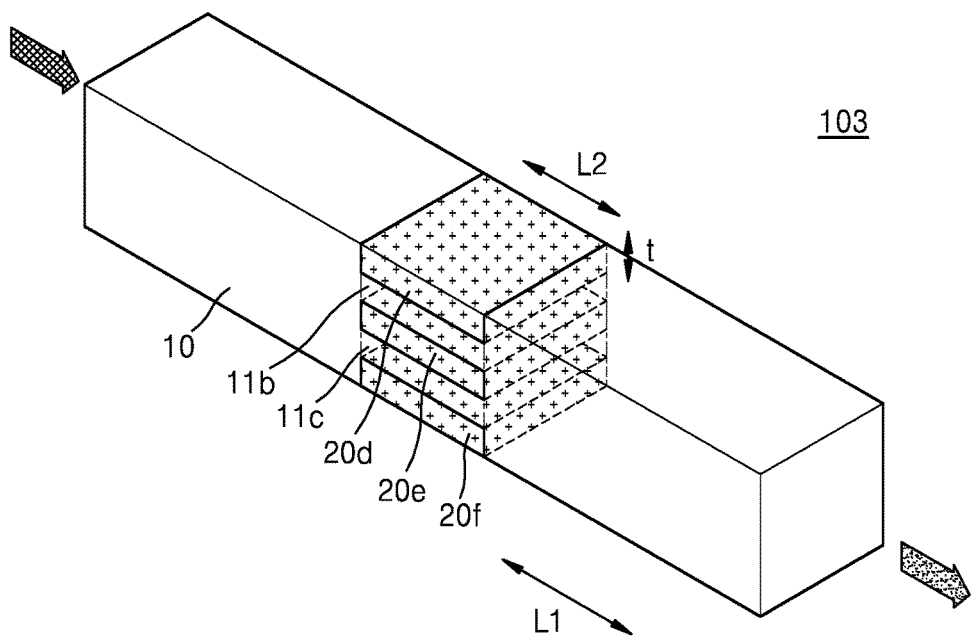

FIGS. 2 through 4 are diagrams of optical modulators 101, 102, and 103 according to different exemplary embodiments. As illustrated in FIG. 2, an optical modulating layer 20a of the optical modulator 101 may be inside the optical wave guide 10. Thus, an entire surface area of the optical modulating layer 20a may be surrounded by the optical wave guide 10. Since the optical modulating layer 20a having the strain occur therein is in the inside area of the optical wave guide 10, modulation of light may be more stably performed.

Alternatively, the optical modulator may include the plurality of optical modulating layers separated from each other. As illustrated in FIG. 3, the optical modulator 102 may include a first optical modulating layer 20b and a second optical modulating layer 20c separated from each other. For example, the first optical modulating layer 20b may be on one side surface of the optical wave guide 10 and the second optical modulating layer 20c may be on the other side surface of the optical wave guide 10. In addition, a portion of the optical wave guide 10, that is, the optical wave layer 11a may be between the first and second optical modulating layers 20b and 20c. The first and second optical modulating layers 20b and 20c may be facing a direction perpendicular to the longitudinal direction L1 of the optical wave guide 10.

The first and second optical modulating layers 20b and 20c may include materials having different lattice constants from the optical wave guide 10, be of thin layer types, and have strain generated therein by means of the difference in the lattice constants. When the optical wave layer is also thin, the strain may be additionally generated. The first and second optical modulating layers 20b and 20c may include identical materials or different materials from each other. Alternatively, the first and second optical modulating layers 20b and 20c may include identical elements while composition ratios of elements are different from each other.

Alternatively, as illustrated in FIG. 4, the optical modulator 103 may include three or more optical modulating layers 20d, 20e, and 20f separated from each other. Some of the optical modulating layers (20d and 20f) may be embedded on side surfaces of the optical modulator 103 and the other of the optical modulating layers (20e) of the optical modulating layer 20 may be embedded inside the optical modulator 103. In addition, a plurality of optical wave layers 11b and 11c may be between the optical modulating layers 20d, 20e, and 20f. A plurality of optical modulating layers 20d, 20e, and 20f and the plurality of optical wave layers 11b and 11c may be alternately arranged in a direction parallel to the longitudinal direction L1 of the optical wave guide 10. Intervals between the optical modulating layers 20d, 20e, and 20f may be determined as periodical or non-periodical according to phases to be modulated. In addition, when the optical wave layers 11b and 11c are of the thin layer types, the optical wave layers 11b and 11c may modulate the phase of light along with the optical modulating layers 20d, 20e, and 20f. As described above, various types of the phase modulation may be realized by varying layers generating the strain.

Figure 5:
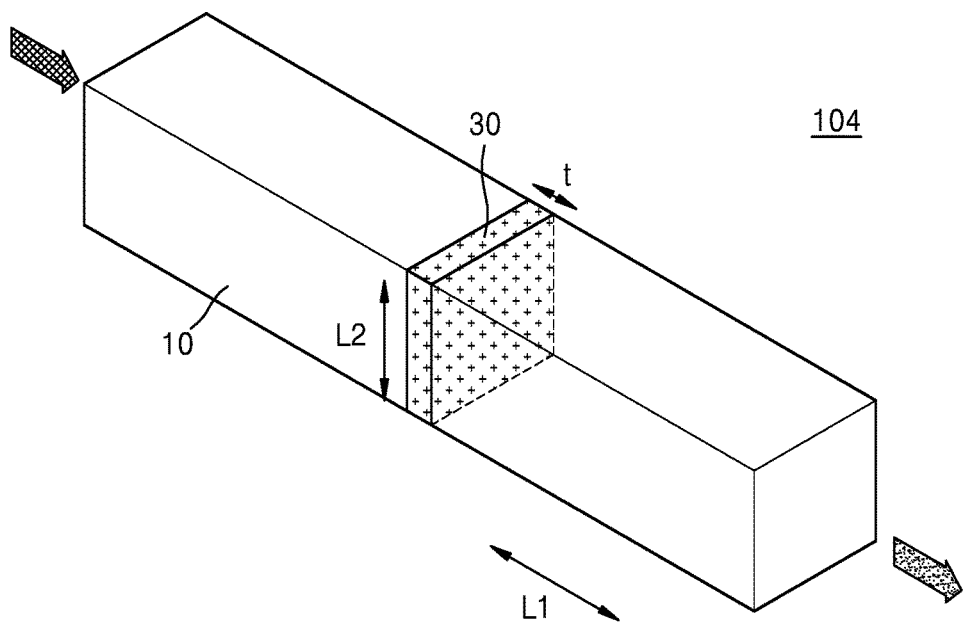
FIGS. 5 through 8 are diagrams of optical modulators according to different embodiments.

Alternatively, a longitudinal direction of the optical modulating layers may intersect with a longitudinal direction of the optical wave guide. FIGS. 5 through 8 are diagrams of optical modulators 104, 105, 106, and 107 according to different embodiments. As illustrated in FIG. 5, the optical modulator 104 may include the optical wave guide 10 having light proceeding therethrough, and an optical modulating layer 30 being embedded in the optical wave guide 10 and modulating the phase of light by means of the difference in the lattice constant from the optical wave guide 10.

The optical wave guide 10 may be the layer transmitting incident light with little light loss. The length of the optical wave guide 10 may be greater than the side length of the cross-section of the optical wave guide 10. Thus, light may be incident on the optical wave guide 10 through one end of the optical wave guide 10, proceed in the longitudinal direction L1 of the optical wave guide 10, and then, exit through the other end of the optical wave guide 10. In other words, the longitudinal direction L1 of the optical wave guide 10 may be the same as the direction in which light proceeds. The length of the optical wave guide 10 may be in the range of dozens of micrometers to hundreds of micrometers. The cross section of the optical wave guide 10 is illustrated as a square in FIG. 5. However, the present disclosure is not limited thereto. The cross section of the optical wave guide 10 may have various shapes such as a circle.

The optical wave guide 10 may include at least one of group IV elements, group III/V elements, silicon dioxides, and silicon nitrides. However, the present disclosure is not limited thereto. For example, the optical wave guide 10 may include Si as a group IV element, at least one of Al, Ga, and In as a group III element, binary compound, ternary compound, or quaternary compound formed with at least one of P, As, and Sb as a group V element, SiN, and at least one combination of these combinations.

The optical modulating layer 30 may be embedded in the optical wave guide 10. As illustrated in FIG. 5, at least a portion of the optical modulating layer 30 may be embedded from a surface of the optical wave guide 10 toward the inside of the optical wave guide 10. In addition, the other portion of the optical modulating layer 30 may extend to the surface of the optical wave guide 10 and be exposed together with the optical wave guide 10.

The optical modulating layer 30 may be of a thin layer type. The longitudinal direction L2 of the optical modulating layer 30 may intersect with the longitudinal direction L1 of the optical wave guide 10. For example, the longitudinal direction L2 of the optical modulating layer 30 may be perpendicular to the longitudinal direction L1 of the optical wave guide 10.

A direction of the thickness t of the optical modulating layer 30 may be parallel to the longitudinal direction L1 of the optical wave guide 10. In addition, the thickness t of the optical modulating layer 30 may be less than the length L2 of the optical modulating layer 30 and may be, for example, equal to or less than about 100 nm.

The optical modulating layer 30 may include a material having a different lattice constant from the optical wave guide 10, and modulate the phase of the light proceeding therethrough by means of the above-described difference in the lattice constants. Even though materials included in the optical modulating layer 30 and the optical wave guide 10 are different from each other, the lattice constant of the optical modulating layer 30 and the lattice constant of the optical wave guide 10 may be similar to each other. For example, a ratio of a lattice constant of the optical wave guide 10 to a lattice constant of the optical modulating layer 30 may be in the range of about 0.9 to about 1.1. In addition, a refractive index of the optical modulating layer 30 and a refractive index of the optical wave guide 10 may be similar to each other. For example, a difference between the refractive index of the optical modulating layer 30 and the refractive index of the optical wave guide 10 may be equal to or less than about 1.5.

The optical modulating layer 30 may include at least one of group IV elements, group III/V elements, silicon oxides, and silicon nitrides. However, the present disclosure is not limited thereto. For example, the optical wave guide 10 may include Si as a group IV element, at least one of Al, Ga, and In as a group III element, binary compound, ternary compound, or quaternary compound formed with at least one of P, As, and Sb as a group V element, SiN, and at least one combination of these combinations.

In detail, the optical wave guide 10 and the optical modulating layer 30 may include different elements from each other. In other words, the optical wave guide 10 may include the first element, while the optical modulating layer 30 may include the second element. Even though the first and second elements are different from each other, lattice constants thereof may be similar to each other. For example, the optical wave guide 10 may include Si, while the optical modulating layer 30 may include Ge. The Si and Ge may have single crystals.

Alternatively, the optical modulating layer 30 may further include other elements in addition to elements included in the optical wave guide 10. In other words, the optical wave guide 10 may include the first element, and the optical modulating layer 30 may include the first and second elements. For example, the optical wave guide 10 may include Si, while the optical modulating layer 30 includes a Si—Ge alloy in a Si—Ge super-lattice. When the optical modulating layer 30 includes a plurality of elements, the composition ratio between the plurality of elements may be constant or may vary. The composition ratio and a change in the composition ratio may vary depending on the phase to be modulated.

Even though the optical wave guide 10 and the optical modulating layer 30 may include identical elements, the lattice constants of the optical wave guide 10 and the optical modulating layer 30 may vary according to different composition ratios between elements. For example, the optical wave guide 10 may include $SiO_2$, while the optical modulating layer 30 includes $SiO_3$.

When the optical modulating layer 30 having a different lattice constant is embedded in the optical wave guide 10, the phase of light proceeding through the optical modulating layer 30 may be modulated due to a difference in the lattice constants. In detail, when materials having mismatched lattice constants are laminated, the strain may occur in each material due to the difference in the lattice constants. The strain may change optical characteristics of each material such as the refractive index. In addition, the optical characteristics may modulate the phase of the proceeding light.

As the optical modulating layer 30 becomes thicker, defects such as dislocation may occur and accumulated strain may disappear. Thus, the optical modulating layer 30 may need to have a thickness at which the strain does not disappear. For example, the optical modulating layer 30 may have a thickness of approximately equal to or less than about 100 nm.

In FIG. 5, the optical modulating layer 30 is illustrated as a portion thereof exposed to a top side area of the optical wave guide 10. However, the present disclosure is not limited thereto. The optical modulating layer 30 may be at various locations in the optical wave guide 10 and a plurality of optical modulating layers 30 may be in the optical wave guide 10.

Figure 6:
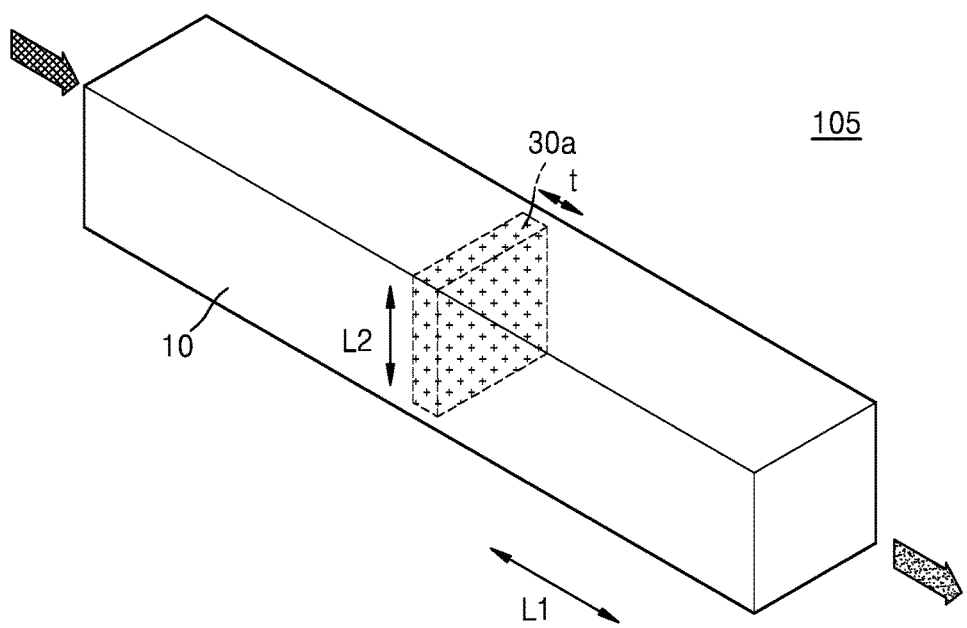

Alternatively, as illustrated in FIG. 6, an optical modulating layer 30a of the optical modulator 105 may be inside the optical wave guide 10. Thus, an entire surface area of the optical modulating layer 30a may be surrounded by the optical wave guide 10. A direction of the thickness t of the optical modulating layer 30a may be parallel to the longitudinal direction L1 of the optical wave guide 10. Since the optical modulating layer 30a having the strain occur therein is in the inside area of the optical wave guide 10, modulation of light may be more stably performed.

Figure 7:
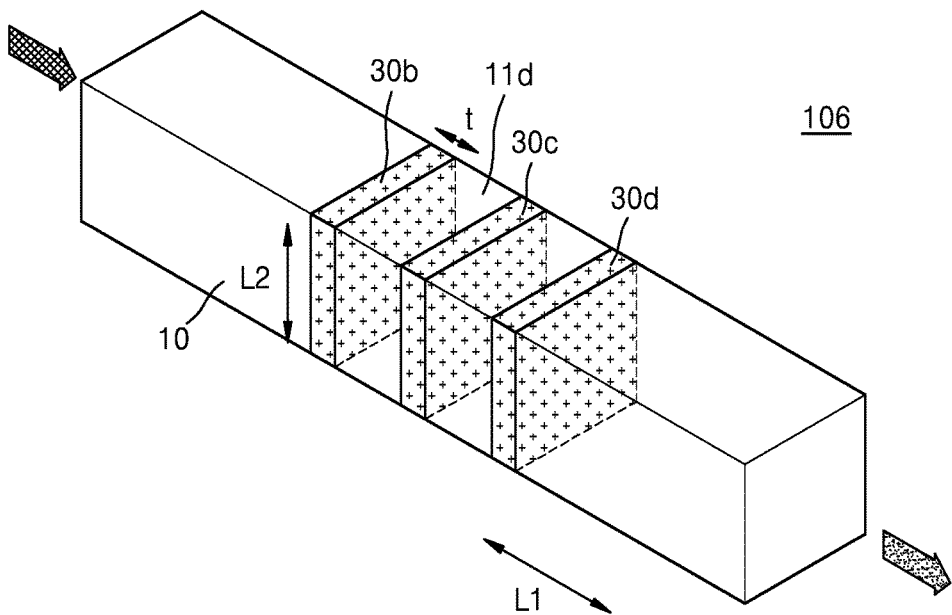

Alternatively, the optical modulator may include a plurality of optical modulating layers separated from each other. As illustrated in FIG. 7, an optical modulator 106 may include a plurality of optical modulating layers 30b, 30c, and 30d separated from each other. An optical wave layer 11d may be between the plurality of optical modulating layers 30b, 30c, and 30d. The optical wave layer 11d and the optical wave guide 10 may include identical materials and each of the plurality of optical modulating layers 30b, 30c, and 30d may include different materials from the material of the optical wave guide 10. The plurality of optical modulating layers 30b, 30c, and 30d may include identical materials or at least two optical modulating layers of the plurality of optical modulating layers 30b, 30c, and 30d may include different materials from each other. For example, some of the plurality of optical modulating layers 30b, 30c, and 30d may include Ge, and the other of the plurality of optical modulating layers 30b, 30c, and 30d may include Ge—Si alloy. Intervals between optical modulating layers 30b, 30c, and 30d may be arranged as uniform or non-uniform. In addition, when a thickness of the optical wave layer 11d is sufficiently thin (e.g., below a threshold), the optical wave layers 11d may modulate light.

The intervals between the optical modulating layers, the materials, the number, etc. of the optical modulating layers may be differently designed according to the phases to be modulated. As described above, the phase modulation may be variously realized by varying layers generating the strain.

Figure 8:
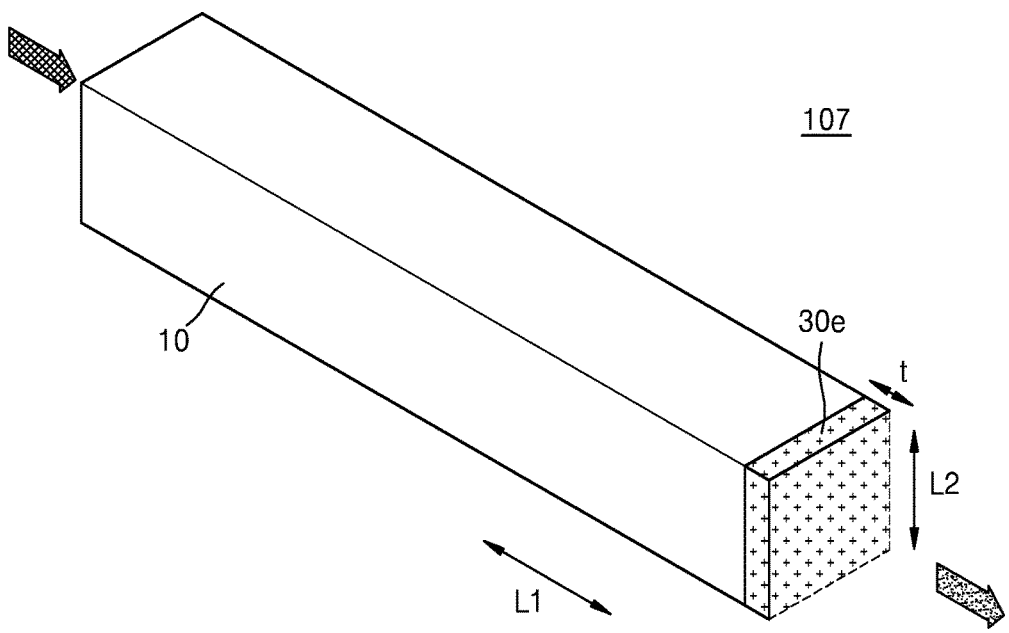

Alternatively, as illustrated in FIG. 8, the optical modulating layer 30e may be in contact with one end of the optical wave guide 10. The optical modulating layer 30e illustrated in FIG. 8 may not be embedded in the optical wave guide 10. When the optical modulating layer 30e includes a different material from the optical wave guide 10 and is of a thin layer type, the strain may be generated by means of a difference in the lattice constants, and thus, the phase of light proceeding through the optical modulating layer 30e may be modulated.

Figure 9:
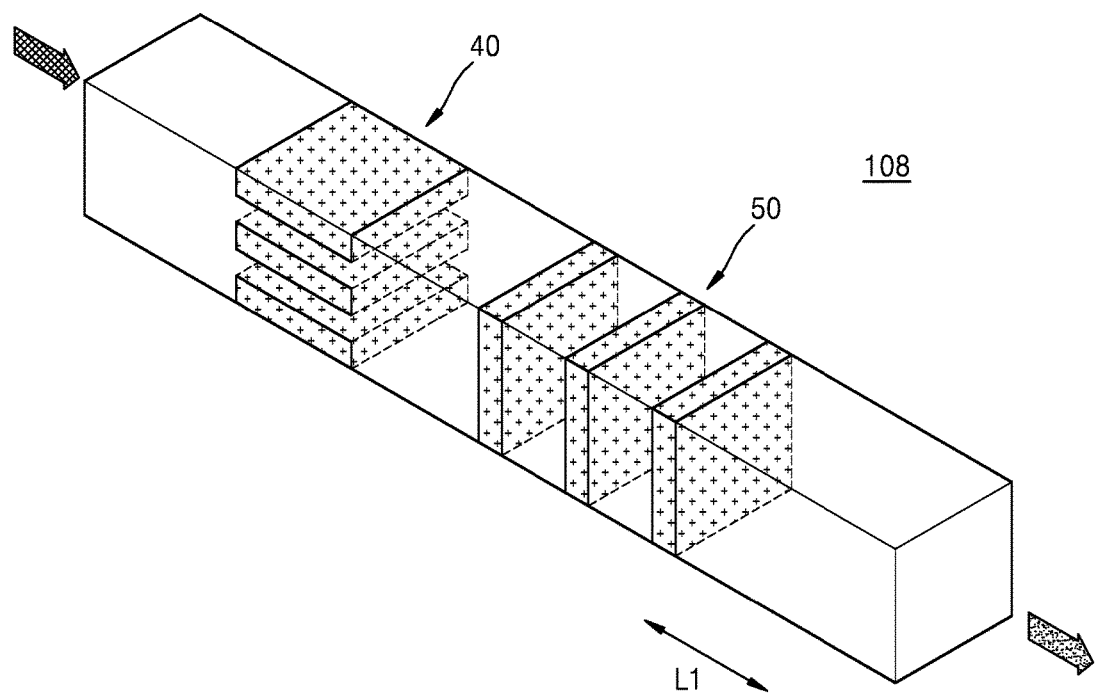
FIG. 9 is an optical modulator according to an exemplary embodiment.

FIG. 9 is a diagram of an optical modulator 108 according to another embodiment. As illustrated in FIG. 9, the optical modulator 108 may include both a vertical type modulating layer 40 and a horizontal type modulating layer 50. The vertical type modulating layer 40 may be any one of the modulating layers described above in FIGS. 1 through 4, and the horizontal type modulating layer 50 may be any one of the modulating layers illustrated in FIGS. 5 through 8.

As described above, the phase of light proceeding through the optical wave guide may be modulated by arranging the optical modulating layer, which includes a different lattice constant from the optical wave guide and is of the thin layer type, in contact with or embedded in the optical wave guide. A level of the phase modulation may vary depending on the material, the location, the number of the optical modulating layer, an arrangement relationship between the optical modulating layers, etc.

Figure 10:
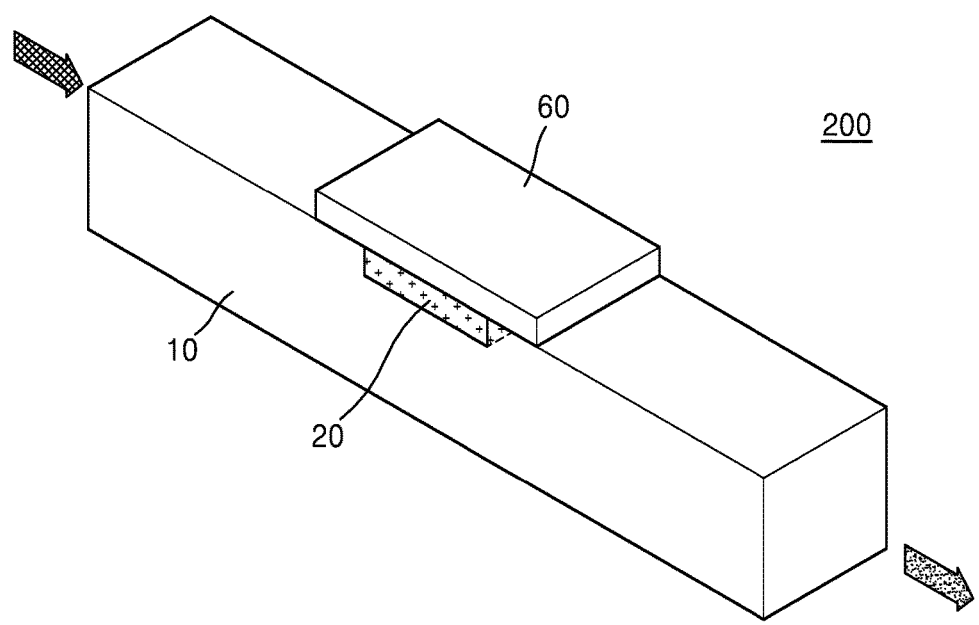
FIG. 10 is a diagram of a hybrid type optical modulator according to an exemplary embodiment.

FIG. 10 is a diagram of a hybrid type optical modulator 200 according to an exemplary embodiment. As illustrated in FIG. 10, the hybrid type optical modulator 200 may further include a heat providing layer 60 providing heat to the optical modulator 200 arranged on the optical modulator 200. The optical modulator 200 illustrated in FIG. 10 may include the optical modulator 100 illustrated in FIG. 1. However, the present disclosure is not limited thereto. The optical modulators illustrated in FIGS. 2 through 9 may be applied also. The heat providing layer 60 may include a material generating heat by an applied voltage. For example, the heat providing layer 60 may include carbon. In addition, an electrode applying a voltage may be on the heat providing layer 60.

When heat is provided to the optical modulator 200, the refractive index of the optical modulator 200 may be changed by the heat, and thus, the phase of the proceeding light may be modulated by means of a changed refractive index. When at least a portion of the heat providing layer 60 overlaps with the optical modulating layer 20, the optical modulating layer 20 having had the strain therein may have a higher level of strain due to the heat, and thus, a span of the phase modulation may increase.

In addition, the hybrid type optical modulator may further include an electric charge providing layer providing electric charges to the optical modulating layer.

Figure 11:
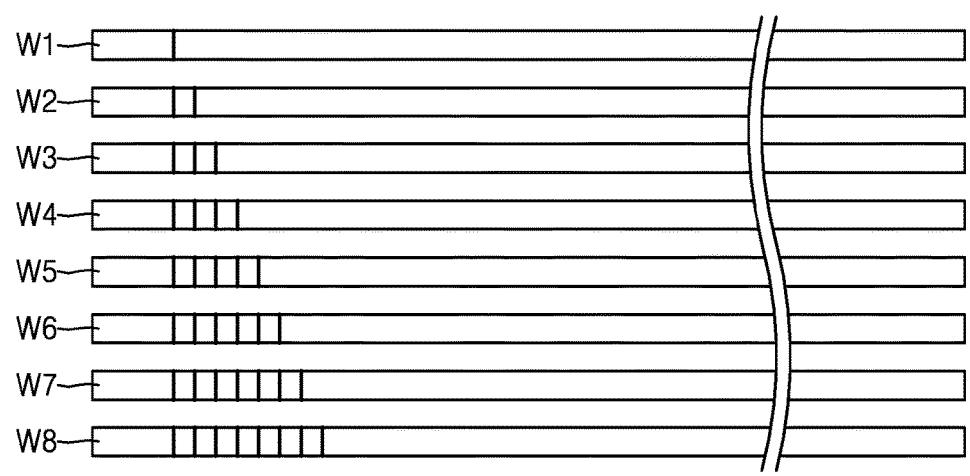
FIG. 11 is a diagram of an optical modulating array according to an exemplary embodiment.

A plurality of optical modulators described above may be combined into an optical modulating array. FIG. 11 is a diagram of an optical modulating array 300 according to an exemplary embodiment. As illustrated in FIG. 11, the optical modulating array 300 may include a plurality of optical modulators separated from each other. The plurality of optical modulators may be parallel to each other. In FIG. 11, a first through eighth optical modulators w1 through w8 are illustrated, but the total number may vary. Each of the first through eighth optical modulators w1 through w8 may be any one of the optical modulators described above and may independently modulate the phase of light.

For example, light transmitting the first optical modulator w1 may be modulated by a first level, light transmitting the second optical modulator w2 may be modulated by a second level, light transmitting the third optical modulator w3 may be modulated by a third level, and so forth. In this method, light transmitting the eighth optical modulator w8 may be modulated by an eighth level. In other words, lights transmitting the plurality of first through eighth optical modulators w1 through w8 may be modulated by a certain (fixed) difference. As a result, wave-fronts of lights outputted from each of the first through eighth optical modulators w1 through w8 may be controlled and thus, a direction of an outputted light may be controlled. In addition, the phase may be controlled by using a structure including a plurality of optical modulators of a same length which include an area having a same-length strain applied therein (e.g., a plurality of wave guides having the same length as the first optical modulator w1).

The optical modulators and the optical modulating array described above may be used for identifying objects or terrains by means of light, and measuring distances, shapes, physical properties, locations, etc. of the objects or the terrains. Accordingly, the optical modulators and the optical modulating array described above may be applied to autonomous vehicles, flying vehicles such as drones, mobile devices, small-size personal vehicles (for example, bicycles, motorcycles, strollers, boards, etc.), robots, auxiliary means for people and animals (for example, canes, helmets, clothes, accessories, watches, bags, etc.), internet of things (IoT) devices, and building security systems.

It should be understood that various exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An optical modulator comprising:
   an optical wave guide configured to allow light to pass in a longitudinal direction of the optical wave guide, the optical wave guide comprising a first material having a first lattice constant; and
   an optical modulating layer having a thickness and embedded in the optical wave guide, the optical modulating layer comprising a second material having a second lattice constant different from the first lattice constant, and the optical modulating layer being configured to modulate a phase of the light based on a difference between the first lattice constant and the second lattice constant,
   wherein the thickness of the optical modulating layer is equal to or less than 100 nm such that the phase of light proceeding through the optical modulating layer is modulated based on a strain generated by a difference in the lattice constants between the optical wave guide and the optical modulating layer.

2. The optical modulator of claim 1, wherein each of the optical wave guide and the optical modulating layer comprises at least one of a group IV element, a group III elements, a group V element, and a silicon nitride.

3. The optical modulator of claim 1, wherein a ratio of the second lattice constant to the first lattice constant is equal to or greater than 0.9 and equal to or less than 1.1.

4. The optical modulator of claim 1, wherein the optical modulating layer comprises an element that is not included in the optical wave guide.

5. The optical modulator of claim 1, wherein the optical modulating layer comprises (i) a first element included in the optical wave guide and (ii) a second element not included in the optical wave guide.

6. The optical modulator of claim 5, wherein a composition ratio of the first element and the second element is constant.

7. The optical modulator of claim 1, wherein each of the optical wave guide and the optical modulating layer comprises a first element and a second element, and a composition ratio of the first element and the second element in the optical wave guide is different from a composition ratio of the first element and the second element in the optical modulating layer.

8. The optical modulator of claim 1, wherein the optical modulating layer is of a thin layer type.

9. The optical modulator of claim 1, wherein a thickness of the optical modulating layer is equal to or less than 100 nm.

10. The optical modulator of claim 1, wherein a longitudinal direction of the optical modulating layer is parallel to a longitudinal direction of the optical wave guide.

11. The optical modulator of claim 1, wherein a longitudinal direction of the optical modulating layer intersects with a longitudinal direction of the optical wave guide.

12. The optical modulator of claim 1, wherein a portion of the optical modulating layer is exposed to a surface of the optical modulator.

13. The optical modulator of claim 1, wherein an entire surface area of the optical modulating layer is surrounded by the optical wave guide.

14. The optical modulator of claim 1, further comprising an additional optical modulating layer embedded in the optical wave guide, the additional optical modulating layer being separated from the optical modulating layer.

15. The optical modulator of claim 14, wherein the optical modulating layer and the additional optical modulating layer are arranged in one of a direction parallel to a longitudinal direction of the optical wave guide and a direction perpendicular to the longitudinal direction of the optical wave guide.

16. The optical modulator of claim 1, further comprising a heat providing layer disposed on the optical modulator and configured to provide heat to the optical modulator.

17. The optical modulator of claim 16, wherein the heat providing layer overlaps with at least a portion of the optical modulating layer.

18. An optical modulating array comprising:
    a plurality of optical modulators, each of the plurality of optical modulators comprising:
      an optical wave guide configured to allow light to pass in a longitudinal direction of the optical wave guide, the optical wave guide comprising a first material having a first lattice constant, and
      an optical modulating layer having a thickness and embedded in the optical wave guide, the optical modulating layer comprising a second material having a second lattice constant different from the first lattice constant, and the optical modulating layer being configured to modulate a phase of the light based on a difference between the first lattice constant and the second lattice constant,
    wherein the plurality of optical modulators are separated from each other,
    wherein the thickness of the optical modulating layer is equal to or less than 100 nm such that the phase of light proceeding through the optical modulating layer is modulated based on a strain generated by a difference in the lattice constants between the optical wave guide and the optical modulating layer.

19. The optical modulating array of claim 18, wherein at least two optical modulators of the plurality of optical modulators have different levels of phases to be modulated.

20. The optical modulating array of claim 19, wherein a level of the modulated phase varies depending on at least one of a location, a size, a number, and a material of the plurality of optical modulators.

* * * * *